US012677839B2

(12) United States Patent
Van Beers

(10) Patent No.: US 12,677,839 B2
(45) Date of Patent: Jul. 14, 2026

(54) VIBRATORY CONVEYOR, FOOD PROCESSING LINE AND METHOD OF PROCESSING FOOD PRODUCTS

(71) Applicant: GEA FOOD SOLUTIONS BAKEL B.V., Bakel (NL)

(72) Inventor: Harrie Van Beers, JN Budel (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 18/567,252

(22) PCT Filed: Jun. 29, 2022

(86) PCT No.: PCT/EP2022/067854
§ 371 (c)(1),
(2) Date: Dec. 5, 2023

(87) PCT Pub. No.: WO2023/275126
PCT Pub. Date: Jan. 5, 2023

(65) Prior Publication Data
US 2024/0260592 A1 Aug. 8, 2024

(30) Foreign Application Priority Data
Jul. 1, 2021 (EP) ..................................... 21183146

(51) Int. Cl.
*A22C 9/00* (2006.01)
*B65G 27/04* (2006.01)
(Continued)

(52) U.S. Cl.
CPC .............. *A22C 9/004* (2013.01); *A22C 9/001* (2013.01); *B65G 27/04* (2013.01); *B65G 27/20* (2013.01);
(Continued)

(58) Field of Classification Search
None
See application file for complete search history.

(56) References Cited

U.S. PATENT DOCUMENTS 3,863,556 A 2/1975 Townsend
8,714,362 B2 * 5/2014 Jones ...................... B07B 1/469
209/265
(Continued)

FOREIGN PATENT DOCUMENTS

CN 105394592 A 3/2016
CN 209376578 U 9/2019
(Continued)

OTHER PUBLICATIONS

Search Report and Written Opinion dated Oct. 18, 2022, for International Application PCT/EP2022/067854.
(Continued)

*Primary Examiner* — Kavel Singh
(74) *Attorney, Agent, or Firm* — The Dobrusin Law Firm, P.C.

(57) ABSTRACT

A vibratory conveyor for shaking food products and conveying the food products in a horizontal direction, the conveyor includes at least one transport element configured to carry the food products and to allow draining of liquid through the at least one transport element, an actuator configured to cause a vibration of the at least one transport element, the actuator is configured to generate a stroke with an amplitude in a range of 8 mm to 16 mm, and a drip tray arranged below the at least one transport element and configured to receive the liquid draining through the at least one transport element.

6 Claims, 1 Drawing Sheet

(51) Int. Cl.
| | |
|---|---|
| *B65G 27/20* | (2006.01) |
| *B65G 27/22* | (2006.01) |
| *B65G 27/24* | (2006.01) |

(52) U.S. Cl.
CPC .............. *B65G 27/22* (2013.01); *B65G 27/24* (2013.01); *B65G 2201/0202* (2013.01)

(56) References Cited

U.S. PATENT DOCUMENTS

| | | | | |
|---|---|---|---|---|
| 9,463,935 | B1 * | 10/2016 | Karpinsky | ............. B65G 47/24 |
| 9,481,525 | B1 * | 11/2016 | Dunham | ................ B65G 27/32 |
| 2013/0277284 | A1 | 10/2013 | Jones et al. | |

FOREIGN PATENT DOCUMENTS

| | | | |
|---|---|---|---|
| EP | 2665370 | A1 | 11/2013 |
| EP | 2708148 | A1 | 3/2014 |
| FR | 2726157 | A1 | 5/1996 |
| GB | 800355 | A | 8/1958 |
| RU | 1777778 | A1 | 11/1992 |
| WO | 2012/099786 | A1 | 7/2012 |

OTHER PUBLICATIONS

International Preliminary Report on Patentability dated Sep. 14, 2023, for International Application PCT/EP2022/067854.

European Examination Report dated Apr. 9, 2025, for European Application 22735907.2.

Bravonorthamerica; Bibliographic information for Coating Belt—enrobing chocolate machine, Online Publication Date May 12, 2014. https://www.youtube.com/watch?v=5re4G80pYzA.

Chinese First Office Action Dated Aug. 1, 2025, for Chinese Application 202280047111.0.

* cited by examiner

VIBRATORY CONVEYOR, FOOD PROCESSING LINE AND METHOD OF PROCESSING FOOD PRODUCTS

CROSS-REFERENCE TO RELATED APPLICATIONS

This application is a US National Stage entry of PCT/EP2022/067854 filed on Jun. 29, 2022, which claims priority to EP 21183146.6 filed on Jul. 1, 2021, all of which are hereby incorporated by reference herein for all purposes.

FIELD

The present invention relates to the field of food processing, in particular in-line food processing. It finds particular application in processing of heavy pieces of meat, in particular pieces of meat containing bone.

BACKGROUND

EP 2 708 148 A1 discloses an in-line process for treating meat, wherein a liquid in the form of a brine is injected into the meat. The meat is subsequently subjected to a shaking operation, e.g., by causing a vibration of a support which carries the meat. The prior art process is adapted to be used with rather small pieces of meat like chicken wings or chicken breasts. The process, however, is not well suited for processing of heavy pieces of meat, e.g., pieces of ham exceeding 1 kg.

SUMMARY

In light of this background, it is an object of the invention to improve processing of rather heavy pieces of meat.

To better address this problem, in a first aspect of the invention a vibratory conveyor for shaking of food products and conveying the food products in a horizontal direction in presented, comprising at least one transport element configured to carry the food products and to allow draining of liquid through the transport element, and an actuator configured to cause a vibration of the transport element, wherein the actuator is configured to generate a stroke with an amplitude in the range of 8 mm to 16 mm.

The inventive vibratory conveyor allows to shake and convey large and/or heavy food products at the same time. Shaking allows to remove excess liquid from the food products thereby preventing drip loss further downstream in the processing. Excess liquid may be conducted away through the transport element. Liquid that remains in the food product can be distributed inside the food product by the vibration of the transport element. The actuator of the vibratory conveyor is configured to generate a stroke with an amplitude in the range of 8 mm to 16 mm, thereby being well suited for removing excess liquid from heavy food products by shaking them.

According to the invention, heavy food products are considered to have a weight of at least 1 kg. Preferably, the heavy food products to be used with the vibratory conveyor of the invention have a weight in the range of 1 to 15 kg. The food products may be pieces of meat, in particular pieces of ham. The food products may contain bone.

Preferably, the transport element is a belt or a mesh or a plate. The transport element may be arranged movable with respect to a base of the vibratory conveyor.

According to a preferred embodiment of the invention, the amplitude of the stroke is in the range of 8 mm to 15 mm, preferably in the range of 9 mm to 15 mm, more preferably in the range of 9 mm to 14 mm. According to an even more preferred embodiment, the amplitude is in the range of 11 mm to 14 mm or in the range of 10 mm to 13 mm. By configuring the actuator to generate a stroke in the indicated range, excess liquid removal from heavy food products is can be further improved.

According to a preferred embodiment of the invention, the actuator is configured to generate the stroke in a stroke direction which is arranged at an angle to the horizontal direction. Thereby, the food products carried on the transport element can be caused to move in a direction having a horizontal component. Preferably, the stroke direction comprises a horizontal component that is parallel to a longitudinal axis of the vibratory conveyor, so that food products may be moved by the vibration of the transport element in the longitudinal direction of the vibratory conveyor.

According to a preferred embodiment of the invention, the angle between the stroke direction and the horizontal direction is in the range of 60° to 80°, in particular in the range of 65° to 75°, e.g., 70°. Arranging the stroke direction within one of the indicated ranges has the benefit, that excess liquid can be reliably stripped of heavy food products while being conveyed on the vibratory conveyor.

According to a preferred embodiment of the invention, the actuator is an unbalanced motor, in particular an unbalanced electromagnetic motor. The unbalanced motor may comprise an uneven distribution of mass around an axis of rotation.

According to an alternatively preferred embodiment of the invention, the actuator is a linear actuator, in particular an electromagnetic or hydraulic or pneumatic linear actuator.

According to a preferred embodiment of the invention, the vibratory conveyor includes a drip tray arranged below the transport element so as to receive liquid draining through the transport element. The liquid may accumulate in the drip tray. The liquid received in the drip tray may either be reused in a food processing step or may be disposed.

Preferably, the vibratory conveyor according to the invention has a total length of all of the transport elements in the range of 1 m to 6 m, in particular in the range of 2 m to 6 m. The length may be in the range of 2 m to 3 m, in particular in the range of 2.5 m to 3.0 m. If the vibratory conveyor comprises exactly one transport element, the total length is identical to the length of the transport element. If the vibratory conveyor includes more than one transport element, the total length is the length of all transport elements of the vibratory conveyor measured in a transport direction of the vibratory conveyor.

According to another aspect of the invention, a food processing line is presented comprising an injection apparatus configured to inject liquid into a food product, and a first conveyor configured to either directly or indirectly receive food products from the injection apparatus, wherein the first conveyor is a vibratory conveyor as described before.

The food processing line may serve to address the same problem and to achieve the same benefits as already discussed with regard to the vibratory conveyor.

The first conveyor may directly receive food products from the injection apparatus, e.g., absent any other conveyer in between the injection apparatus and the first conveyor. Alternatively, the first conveyor may indirectly receive food products from the injection apparatus, e.g., via a slide or another conveyor in between the injection apparatus and the first conveyor.

Preferably, the injection apparatus is configured to inject a brine into the food product. The injection apparatus preferably includes one or more injections needles coupled to a reservoir.

According to a preferred embodiment of the invention, the food processing line further comprises a second conveyor configured to receive food products from the first conveyor, wherein the second conveyor is a vibratory conveyor as described before. Preferably, the second conveyor is of the same type as the first conveyor. Thus, the second conveyor may be identical in construction to the first conveyor. The use of a second conveyor comes with the benefit that food products may be exposed to vibrations for a longer period of time. Thereby, more liquid may be removed from the food products than with just one vibratory conveyor and/or liquid that remains in the food products may be further distributed inside the respective food product by the vibration of the second conveyor.

According to a preferred embodiment of the invention, the food processing line comprises a liquid return line configured to return liquid from the first and/or second vibratory conveyor, in particular from a drip tray of the first and/or second vibratory conveyor, to the injection apparatus. The return line allows to return liquid accumulated in the first or second vibratory conveyor, in particular in the drip tray of the respective conveyor, to the injection apparatus for reuse in the injection apparatus. Thereby, the liquid may be more effectively used in the food production process.

Alternatively, or additionally, the beneficial features and/or advantageous embodiments described in conjunction with the vibratory conveyor according to the invention may be implemented in the food processing line according to the invention.

According to yet another aspect of the invention, a method of processing food products, in particular meat pieces, in a food processing line, is presented, wherein liquid is injected into a food product using an injection
        apparatus,
    the food product is received by a first vibratory conveyor
        from the injection apparatus, wherein the first vibratory
        conveyor comprises at least one transport element that
        carries the food product and allows draining of the
        liquid through the transport element, wherein an actua-
        tor causes vibration of the transport element by gener-
        ating a stroke with an amplitude in the range of 8 mm
        to 16 mm.

The method of processing food products may serve to address the same problem and to achieve the same benefits as already discussed with regard to the vibratory conveyor.

According to a preferred embodiment of the invention, the amplitude of the stroke is in the range of 8 mm to 15 mm, preferably in the range of 9 mm to 15 mm, more preferably in the range of 9 mm to 14 mm. According to an even more preferred embodiment, the amplitude is in the range of 11 mm to 14 mm or in the range of 10 mm to 13 mm. By configuring the actuator to generate a stroke in the indicated range, excess liquid removal from heavy food products is can be further improved.

Preferably, the liquid that is injected into the food product is a brine. The liquid may comprise salt and/or spices and/or oil and/or vinegar. The liquid is preferably injected in to the food product by a needle or an array of needles of the injection apparatus.

According to a preferred embodiment of the invention, the food product is carried by the transport element of the vibratory conveyor for a residence time in the range of 10 to 90 seconds, in particular in the range of 20 to 60 seconds, preferably in the range of 30 to 60 seconds, more preferably in the range of 30 to 45 seconds. During the residence time, the food product is shaken and conveyed by the vibratory conveyor.

According to a preferred embodiment of the invention, the actuator causes a vibration of the transport element with a frequency in the range of 10 Hz to 20 Hz, in particular 14 Hz to 17 Hz.

According to a preferred embodiment of the invention, the food product when carried by the vibratory conveyor receives a number of strokes in the range of 400 to 2000. The indicated number of strokes is well suited to remove a sufficient amount of excess liquid from the food products. Preferably, the number of strokes is in the range of 400 to 800 or in the range of 800 to 1200 or in the range of 1200 to 1600 or in the range of 1600 to 2000.

According to a preferred embodiment of the invention, the food product is received by a second vibratory conveyor from the first vibratory conveyor, wherein the second conveyor is a vibratory conveyor as described before. Preferably, the second conveyor is of the same type as the first conveyor. Thus, the second conveyor may be identical in construction to the first conveyor. The use of a second conveyor comes with the benefit that food products may be exposed to vibrations for a longer period of time. Thereby, more liquid may be removed from the food products than with just one vibratory conveyor.

According to a preferred embodiment of the invention, liquid drained from the food product in the first vibratory conveyor is returned to the injection apparatus through a liquid return line. Alternatively, or additionally, liquid drained from the food product in the second vibratory conveyor is returned to the injection apparatus through the same or another liquid return line. The liquid that is returned to the injection apparatus may be subjected to treatment, e.g., filtering and/or heat treatment.

Alternatively, or additionally, the beneficial features and/or advantageous embodiments described in conjunction with the vibratory conveyor and/or the food processing line according to the invention may be implemented in the method of processing food products according to the invention.

These and other aspects of the invention will be apparent from and elucidated with reference to the embodiments described hereinafter.

DETAILED DESCRIPTION

Figure 1:
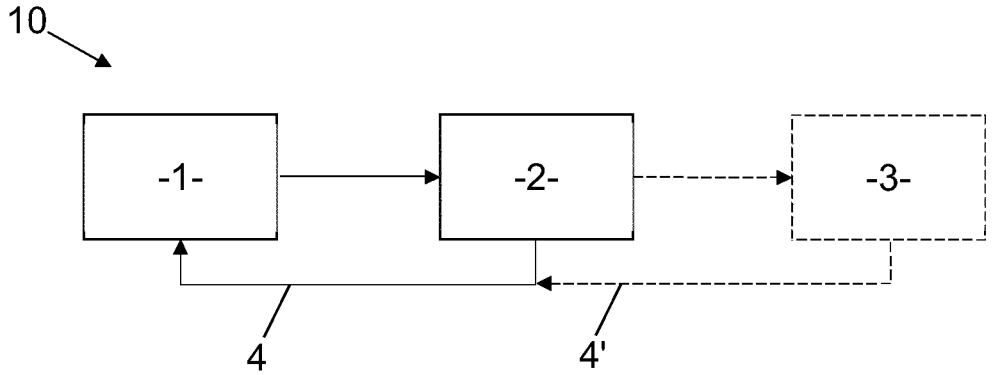
FIG. 1 is a block diagram of a food processing line according to an embodiment of the invention.

FIG. 1 illustrates an embodiment of a food processing line 10 according to the invention. The food processing line 10 is adapted to process heavy pieces of meat, e.g., pieces of ham with a weight in the range of 1 kg to 25 kg. The food processing line 10 comprises an injection apparatus 1 and a first conveyor 2 arranged downstream the injection apparatus 1 so as to receive food products from the injection apparatus 1.

The food products may be fed to the injection apparatus 1 via a product infeed. The injection apparatus comprises an array of needles which penetrate the food product. The needles eject a liquid, in particular a brine, into the food product where it distributes at least partially. After injection of the liquid in the injection apparatus 1, the food products are transferred from the injection apparatus 1 onto the first vibratory conveyor 2.

Figure 2:
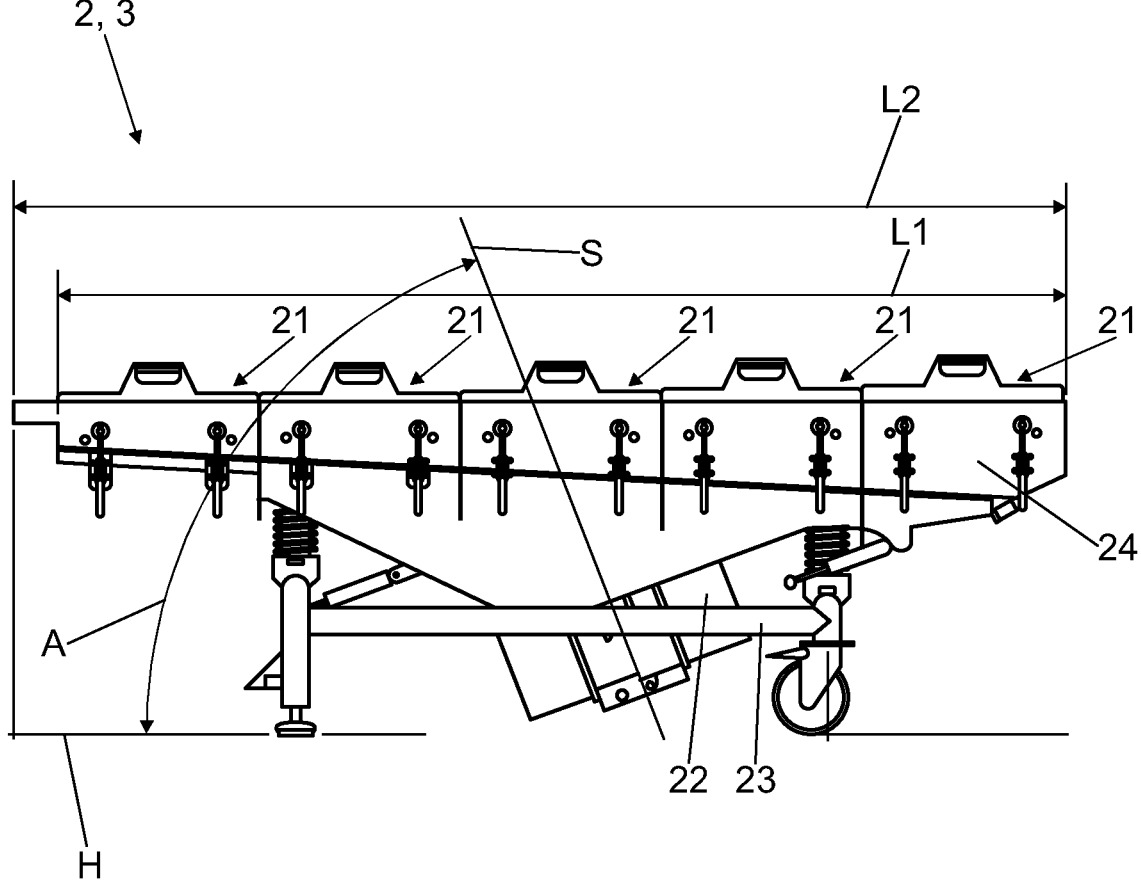
FIG. 2 is a schematic representation of a vibratory conveyor according to an embodiment of the invention.

The first vibratory conveyor 2 comprises at least one transport element 21 that carries the food product and allows draining of the liquid through the transport element 21, see FIG. 2. The first vibratory conveyor 2 further includes an actuator 22 which causes vibration of the transport element 21 by generating a stroke with an amplitude in the range of 8 mm to 16 mm. Preferably the amplitude of the stroke generated by actuator 22 is in the range of 8 mm to 15 mm, preferably in the range of 9 mm to 15 mm, more preferably in the range of 9 mm to 14 mm, in particular in the range of 11 mm to 14 mm or in the range of 10 mm to 13 mm. The food processing line according to the embodiment is capable of processing large pieces of meat due to the amplitude of the stroke generated by actuator 22. Such amplitude results in removal of excess brine after injection which prevents drip loss further downstream in the line. Brine that remains to/within the meat will be intensively shaken to stimulate optimal brine distribution. Beside shaking the meat product, the meat product is also transported by the first vibratory conveyor 2.

Optionally, the food processing line 10 comprises a second vibratory conveyor 3 configured to receive food products from the first vibratory conveyor 2. According to the embodiment, the second conveyor 3 is identical in type to the first vibratory conveyor 2. The first vibratory conveyor 2, and optionally the second vibratory conveyor 3, shake the food products in order to further distribute liquid inside the food products and to release excess liquid from the food products. Excess liquid is collected by the respective vibratory conveyors 2, 3 and fed back via a liquid return line 4, 4' to the injection apparatus 1.

In the following, further details of the vibratory conveyors 2, 3 of the food processing line 10 will be described with reference to FIG. 2.

The vibratory conveyor 2, 3 has a total length L2 in the range of 2 m to 6 m, here in the range of 2.5 m to 3 m. The vibratory conveyor 2, 3 comprises multiple transport elements 21, here exactly five transport elements 21, that are arranged in series along a transport direction of the vibratory conveyor 2, 3. The transport elements 21 are implemented as a belt or a mesh or a plate. A food product can be fed to an entry side of the conveyor, here the right side in FIG. 2, so as to be received by a first transport element 21. Due to the vibration of the transport elements 21 caused by the actuator 22, the food product moves toward the neighboring transport element 21 in the transport direction, here from the right side in FIG. 2 to the left side in FIG. 2. The total length L1 of all transport elements 21 in series is slightly smaller than the total length of the conveyor 2, 3, here it is in the range of 2.5 m to 3 m.

The actuator 22 is configured to generate the stroke in a stroke direction S which is arranged at an angle A to the horizontal direction H. The angle A is in the range of 60° to 80°, in particular in the range of 65° to 75°, e.g., 70°. According to the embodiment, the actuator 22 is an unbalanced motor, in particular an unbalanced electromagnetic motor. The actuator 22 is held by a support structure 23 of the vibratory conveyor 2, 3 and actuates all transport elements 21 of the conveyor 2, 3 simultaneously. According to an alternative embodiment not shown in the figures, the actuator 22 is a linear actuator, in particular an electromagnetic or hydraulic or pneumatic linear actuator.

The vibratory conveyor 2, 3 further includes a drip tray 24 arranged below the transport elements 21 so as to receive liquid draining through the transport elements 21. The liquid accumulates in the drip tray and may be fed back to the injection apparatus via the liquid return line 4, 4'.

The vibratory conveyors 2, 3 can be used in a method of processing food products, in particular meat pieces, wherein the food product is carried by the transport elements 21 of each of the vibratory conveyors 2, 3 for a residence time in the range of 10 to 90 seconds, in particular in the range of 20 to 60 seconds, preferably in the range of 30 to 60 seconds, more preferably in the range of 30 to 45 seconds. The actuator 22 may cause a vibration of the transport elements 21 with a frequency in the range of 10 Hz to 20 Hz, in particular 14 Hz to 17 Hz. Accordingly, the food products when carried by the respective vibratory conveyor 2, 3, each receive a number of strokes in the range of 400 to 2000.

LIST OF REFERENCE SIGNS 1 injection apparatus
2 first vibratory conveyor
3 second vibratory conveyor
10 food processing line
21 transport element
22 actuator
23 support structure
24 drip tray
A angle
L1 length
L2 length
H horizontal direction
S stroke direction

The invention claimed is:

1. A method of processing heavy food products, in a food processing line, wherein the heavy food products have a weight of at least 1 kg, and wherein the method comprises:
   injecting a liquid into the heavy food products using an injection apparatus,
   receiving the heavy food products by a vibratory conveyor from the injection apparatus, wherein the vibratory conveyor comprises at least one transport element that carries the heavy food products and allows draining of the liquid through the at least one transport element, wherein the at least one transport element is arranged horizontally and configured to carry the heavy food products horizontally,
   wherein the vibratory conveyor comprises a drip tray arranged below the at least one transport element to receive the liquid draining through the at least one transport element,
   wherein an actuator causes vibration of the at least one transport element by generating a stroke with an amplitude in a range of 8 mm to 16 mm, the actuator is configured to generate the stroke in a stroke direction, which is arranged at an angle to a horizontal direction, wherein the angle is in a range of 60° to 80°, and
   wherein the actuator causes a vibration of the at least one transport element with a frequency in a range of 10 Hz to 20 Hz, or 14 Hz to 17 Hz.

2. The method according to claim 1, wherein the heavy food products are carried by the at least one transport element of the vibratory conveyor for a residence time in a range of 10 to 90 seconds, or in a range of 20 to 60 seconds, or in a range of 30 to 60 seconds, or in a range of 30 to 45 seconds.

3. The method according to claim 1, wherein the heavy food products, when carried by the vibratory conveyor, receive a number of strokes in a range of 400 to 2000.

4. The method according to claim 1, wherein the actuator is held by a support structure of the vibratory conveyor, the actuator is configured to actuate all transport elements of the vibratory conveyor simultaneously, the support structure extends in the horizontal direction and is parallel to a ground surface, wherein the heavy food products each weigh between 1 kg and 15 kg, and the heavy food products comprise meat having a bone.

5. The method according to claim 4, wherein the actuator is configured to generate the stroke having the amplitude in the range of 8 mm to 16 mm and the stroke direction arranged at the angle of 60° to 80° relative to the horizontal direction so that the liquid injected into the heavy food products is uniformly distributed and excess liquid is removed from the heavy food products during conveyance of the food products, wherein the actuator is a hydraulic or pneumatic linear actuator.

6. The method according to claim 1, wherein the actuator is held by a support structure of the vibratory conveyor, the actuator is configured to actuate all transport elements of the vibratory conveyor simultaneously, the support structure extends in the horizontal direction and is parallel to a ground surface, wherein the heavy food products each weigh between 1 kg and 15 kg and comprise meat having a bone, the actuator is configured to generate the stroke having the amplitude in the range of 8 mm to 16 mm and the stroke direction arranged at the angle of 60° to 80° relative to the horizontal direction so that the liquid injected into the heavy food products is uniformly distributed and excess liquid is removed from the heavy food products during conveyance of the heavy food products, wherein the actuator is a hydraulic or pneumatic linear actuator.

* * * * *